(12) United States Patent
Merchant et al.

(10) Patent No.: US 6,212,626 B1
(45) Date of Patent: *Apr. 3, 2001

(54) COMPUTER PROCESSOR HAVING A CHECKER

(75) Inventors: Amit A. Merchant; David J. Sager, both of Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/222,805

(22) Filed: Dec. 30, 1998

Related U.S. Application Data

(63) Continuation-in-part of application No. 09/106,857, filed on Jun. 30, 1998, which is a continuation-in-part of application No. 08/746,547, filed on Nov. 13, 1996, now Pat. No. 5,966,544.

(51) Int. Cl.[7] ................................................ G06F 15/00
(52) U.S. Cl. ........................... 712/218; 712/23; 712/219
(58) Field of Search ............................ 712/23, 218, 219, 712/233, 239, 234

(56) References Cited

U.S. PATENT DOCUMENTS

| | | | |
|---|---|---|---|
| 5,710,902 | 1/1998 | Sheaffer et al. | 395/392 |
| 5,835,745 | 11/1998 | Sager et al. | 395/391 |
| 5,966,544 | * 10/1999 | Sager | 712/32 |
| 6,065,105 | * 6/2000 | Zaidi et al. | 712/23 |

FOREIGN PATENT DOCUMENTS

| | | |
|---|---|---|
| 0 612 012 | 8/1994 | (EP) . |
| 2 317 724 | 4/1998 | (GB) . |
| 99/31589 | 6/1999 | (WO) . |

* cited by examiner

Primary Examiner—Larry D. Donaghue
(74) Attorney, Agent, or Firm—Kenyon & Kenyon

(57) ABSTRACT

A computer processor that has a checker for receiving an instruction. The checker includes a scoreboard, an input for receiving an external replay signal, and decision logic coupled to the scoreboard and the input. The decision logic determines whether the instruction executed correctly based on both the scoreboard and the external replay signal.

25 Claims, 9 Drawing Sheets

| DISPATCH CYCLE | INST.# | SOURCE 1 | SOURCE 2 | DESTINATION |
|---|---|---|---|---|
| 1 | I1 | r10 | r11 | r12 |
| 2 | I2 | r12 | r10 | r13 |
| 3 | I3 | r12 | r13 | r14 |
| 4 | I4 | r8 | r9 | r15 |
| 5 | I5 | r15 | r10 | r16 |
| 6 | I6 | r15 | r16 | r19 |
| 7 | — | — | — | — |
| 8 | I7 | r19 | r9 | r18 |
| 9 | — | — | — | — |
| 10 | — | — | — | — |

FIG.5

DISPATCH CYCLE 1

DISPATCH CYCLE 2

DISPATCH CYCLE 3

DISPATCH CYCLE 4

DISPATCH CYCLE 5

DISPATCH CYCLE 6

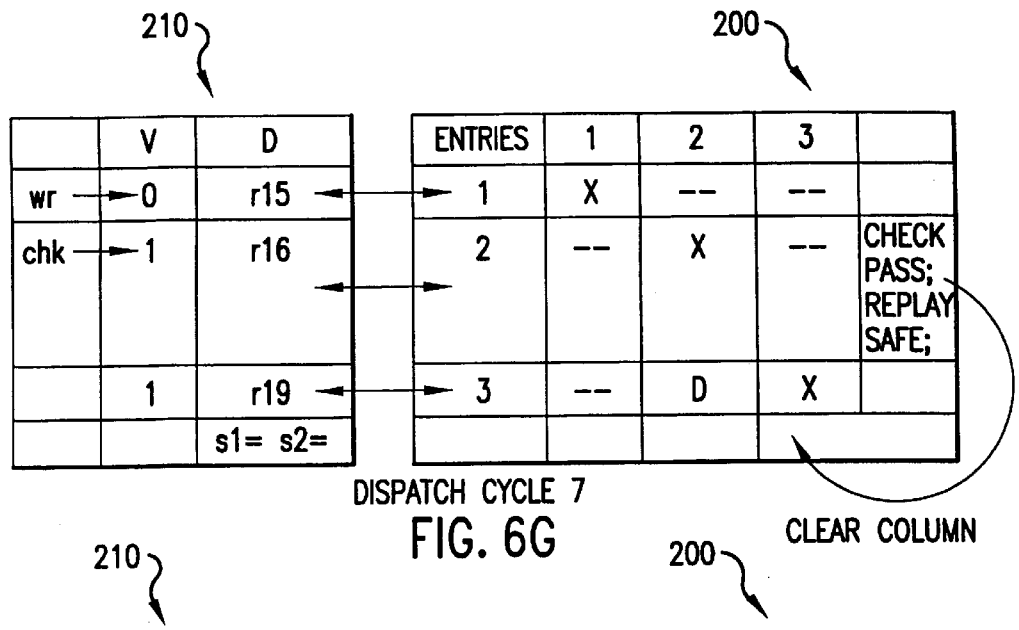
FIG. 6G DISPATCH CYCLE 7
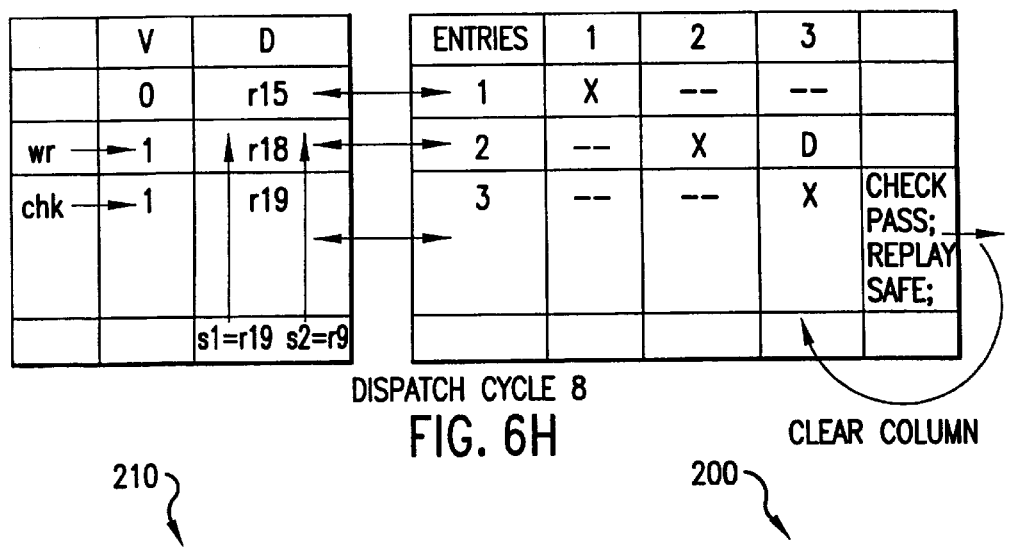
FIG. 6H DISPATCH CYCLE 8
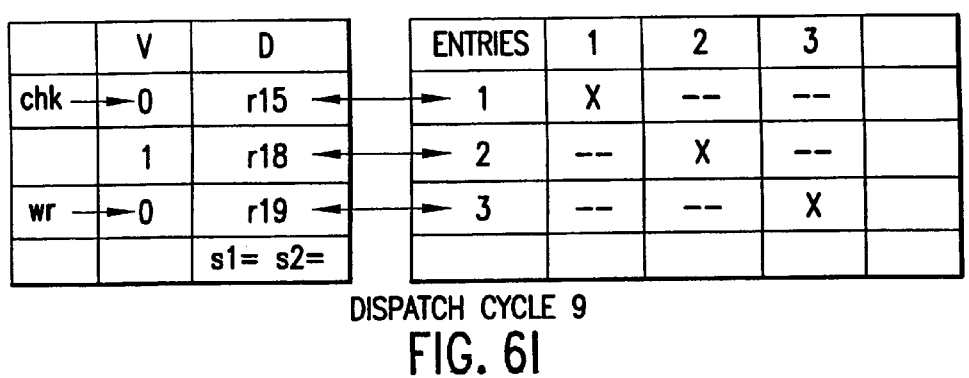
FIG. 6I DISPATCH CYCLE 9

DISPATCH CYCLE 10

COMPUTER PROCESSOR HAVING A CHECKER

CROSS-REFERENCE TO RELATED APPLICATIONS

This application is a continuation-in-part of U.S. patent application Ser. No. 09/106,857, filed Jun. 30, 1998 which is a continuation-in-part of U.S. patent application Ser. No. 08/746,547, filed Nov. 13, 1996, now U.S. Pat. No. 5,966,544.

FIELD OF THE INVENTION

The present invention is directed to a computer processor. More particularly, the present invention is directed to a checker that checks instructions within a computer processor.

BACKGROUND OF THE INVENTION

The primary function of most computer processors is to execute computer instructions. Most processors execute instructions in the programmed order that they are received. However, some recent processors, such as the Pentium® II processor from Intel Corp., are "out-of-order" processors.

An out-of-order processor can execute instructions in any order as the data and execution units required for each instruction becomes available. Some instructions in a computer system are dependent on one other through machine registers. Out-of-order processors attempt to exploit parallelism by actively looking for instructions whose input sources are available for computation, and scheduling them ahead of programmatically later instructions. This creates an opportunity for more efficient usage of machine resources and overall faster execution.

An out-of-order processor can also increase performance by reducing overall latency. This can be done by speculatively scheduling instructions while assuming that the memory subsystem used by the processor is perfect. Therefore, the processor may assume that all cache accesses are hits. This allows dependent arithmetic and logical instructions to be scheduled without the full latency of receiving a confirmation from the memory subsystem that they were executed correctly.

An out-of-order processor that speculatively schedules instructions requires a mechanism to re-execute incorrectly performed instructions. One such mechanism is the replay system that is disclosed in U.S. patent application Ser. No. 09/106,857, filed Jun. 30, 1998. The replay system must include a checking device to determine whether the instructions executed correctly or incorrectly.

Based on the foregoing, there is a need for a checking device for a replay system of a computer processor that speculatively schedules instructions.

SUMMARY OF THE INVENTION

One embodiment of the present invention is a computer processor that has a checker for receiving an instruction. The checker includes a scoreboard, an input for receiving an external replay signal, and decision logic coupled to the scoreboard and the input. The decision logic determines whether the instruction executed correctly based on both the scoreboard and the external replay signal.

BRIEF DESCRIPTION OF THE DRAWINGS

FIG. 5 illustrates a list of instructions that are dispatched in consecutive dispatch cycles by a scheduler.

FIGS. 6A–6J show the condition of a checker matrix engine during each dispatch cycle of FIG. 5.

DETAILED DESCRIPTION

One embodiment of the present invention is a processor that speculatively schedules instructions and that includes a checker within a replay system. The replay system replays instructions that were not executed correctly when they were initially dispatched to an execution unit while preserving the originally scheduled order of the instructions. The checker determines if the instructions were executed correctly.

Figure 1:
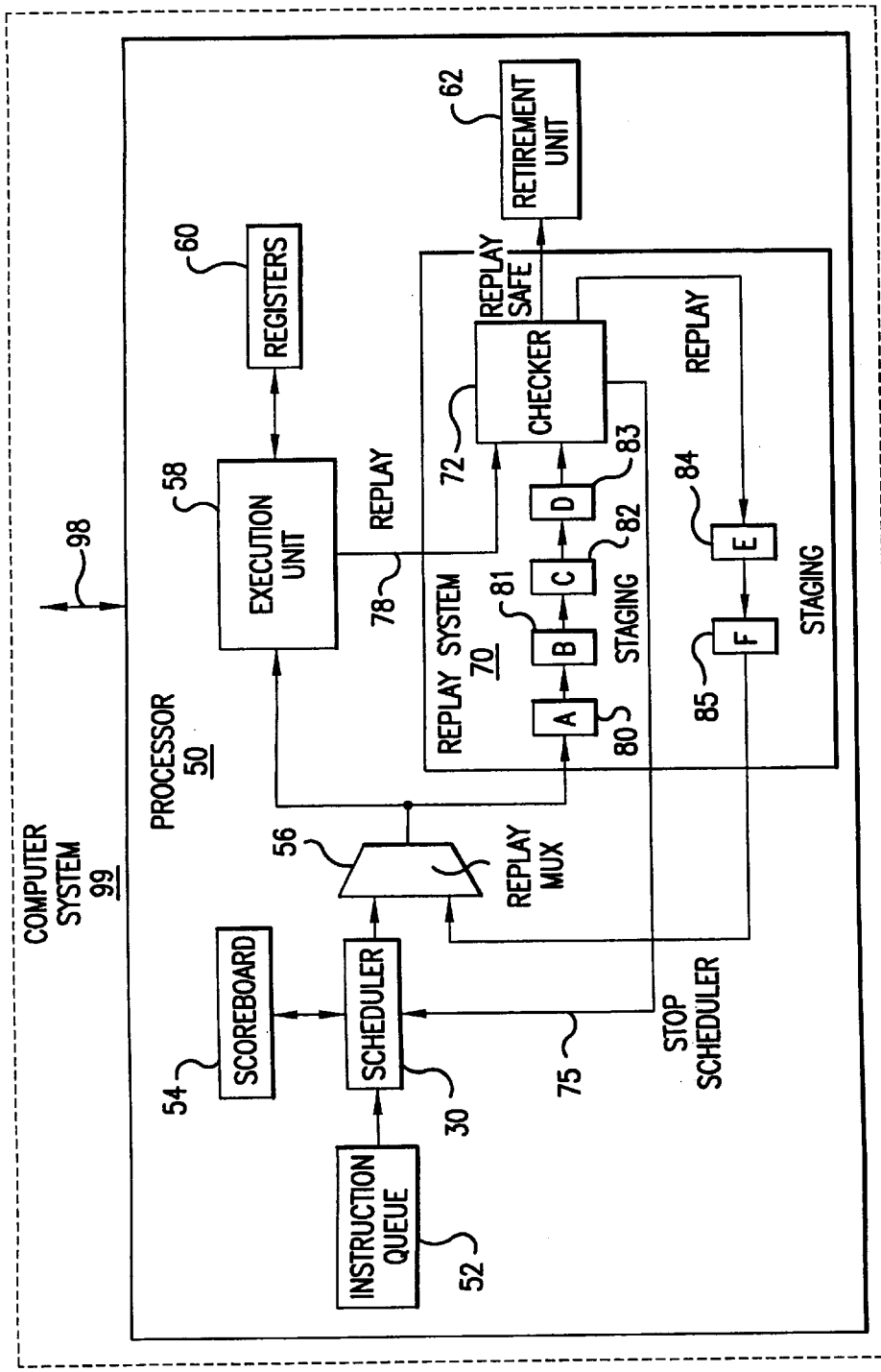
FIG. 1 is a block diagram of a processor with a replay system having a checker.

FIG. 1 is a block diagram of a computer processor with a replay system having a checker in accordance with one embodiment of the present invention. The processor 50 is included in a computer system 99. Processor 50 is coupled to other components of computer system 99, such as a memory device (not shown) through a system bus 98. Processor 50 is an out-of-order processor.

Processor 50 includes an instruction queue 52. Instruction queue 52 feeds instructions into a scheduler 30. In one embodiment, the instructions are "micro-operations." Micro-operations are generated by translating complex instructions into simple, fixed length instructions for ease of execution. Each instruction in one embodiment of the present invention has two logical sources and one logical destination. The sources and destinations are registers within processor 50.

Scheduler 30 dispatches an instruction received from instruction queue 52 when the resources are available to execute the instruction and when input sources needed by the instruction are ready. Scheduler 30 is coupled to a scoreboard 54. Scoreboard 54 tracks the readiness of sources. When an instruction has executed and its result (or destination) register holds correct data, scheduler 30 updates the destination in scoreboard 54 as ready.

Some prior art out-of-order processors that have aggressive architecture designs update the scoreboard ahead of the data actually being available while being fully cognizant of the pipeline nature of the processor. This allows the processor to exploit the latency from dispatch to actual execution. However, the scheduler in these processors still await for confirmation of the correct execution of the instruction.

In contrast, processor 50 is more aggressive and updates scoreboard 54 ahead of the confirmation of correct execution of the instruction. This allows processor 50 to exploit more parallelism and reduce latency further than conventional prior art out-of-order designs, but requires a mechanism such as a replay system 70 to re-execute instructions that were incorrectly scheduled because of the highly speculative scheduling.

Scheduler 30 outputs the instructions to a replay multiplexer 56. The output of multiplexer 56 is coupled to an execution unit 58. Execution unit 58 executes received instructions. Execution unit 58 can be an arithmetic logic unit ("ALU"), a floating point ALU, a memory unit, etc. Execution unit 58 is coupled to registers 60 which are the registers of processor 50. Execution unit 58 loads and stores data in registers 60 when executing instructions.

Replay System 70

Processor 50 further includes a replay system 70. Replay system 70 replays instructions that were not executed correctly after they were scheduled by scheduler 30. Replay system 70, like execution unit 58, receives instructions output from replay multiplexer 56. Replay system 70 includes two staging sections. One staging section includes a plurality of stages 80–83. The other staging section includes stages 84 and 85. Therefore, instructions are staged through replay system 70 in parallel to being staged through execution unit 58. The number of stages 80–85 vary depending on the amount of staging desired in each execution channel.

Replay system 70 further includes a checker 72. In general, checker 72 in accordance with the present invention receives instructions and parses which instructions pass a set of criterion and which do not. In the embodiment shown in FIG. 1 where checker 72 is part of replay system 70, checker 72 receives instructions from stage 83 and determines which instructions have executed correctly and which have not. If the instruction has executed correctly, checker 72 declares the instruction "replay safe" and the instruction is forwarded to a retirement unit 62 where instructions are retired in programmed order. Retiring instructions is beneficial to processor 50 because it frees up processor resources and allows additional instructions to start execution. If the instruction has not executed correctly, checker 72 replays or re-executes the instruction by sending the instruction to replay multiplexer 56 via stages 84 and 85.

In conjunction with sending the replayed instruction to replay multiplexer 56, checker 72 sends a "stop scheduler" signal 75 to scheduler 30. Stop scheduler signal 75 is sent at least one clock cycle in advance of the replayed instruction arriving at replay multiplexer 56. In one embodiment, stop scheduler signal 75 tells scheduler 30 to not schedule an instruction on the next clock cycle. This creates an open slot for the replayed instruction that is output from replay multiplexer 56, and avoids two instructions being input to replay multiplexer 56 on the same clock cycle.

Checker 72

Checker 72's primary function is to parse a stream of instructions to determine which ones were correctly executed and which ones were not. An instruction may execute incorrectly for many reasons. The most common reasons are a source dependency or an external replay condition. A source dependency can occur when an instruction source is dependent on the result of another instruction. Examples of an external replay condition include a cache miss, incorrect forwarding of data (e.g., from a store buffer to a load), hidden memory dependencies, a write back conflict, an unknown data/address, and serializing instructions.

Checker 72 utilizes two sets of criterion to determine whether instructions executed correctly. The first set are external replay conditions generated by an external agent such as a memory subsystem or an execution engine that inform checker 72 that an instruction was executed incorrectly.

The second set are when input sources were not correct at the start of the execution of an instruction. This happens when incorrect data is propagated because of the highly speculative and super pipelined nature of processor 50. When input sources were not correct, by the time an instruction has been determined to have incorrectly executed, many dependent instructions have already been dispatched. False data propagates from the result of one instruction to another through register dependencies. The false data propagation is similar to an ever-expanding tree and can severely deteriorate the performance of processor 50.

For the first criterion, the external replay conditions are received by checker 72 through a replay signal 78. For the second criterion, checker 72 utilizes a scoreboard in one embodiment to determine when input sources were not correct at the start of the execution of an instruction.

Figure 2:
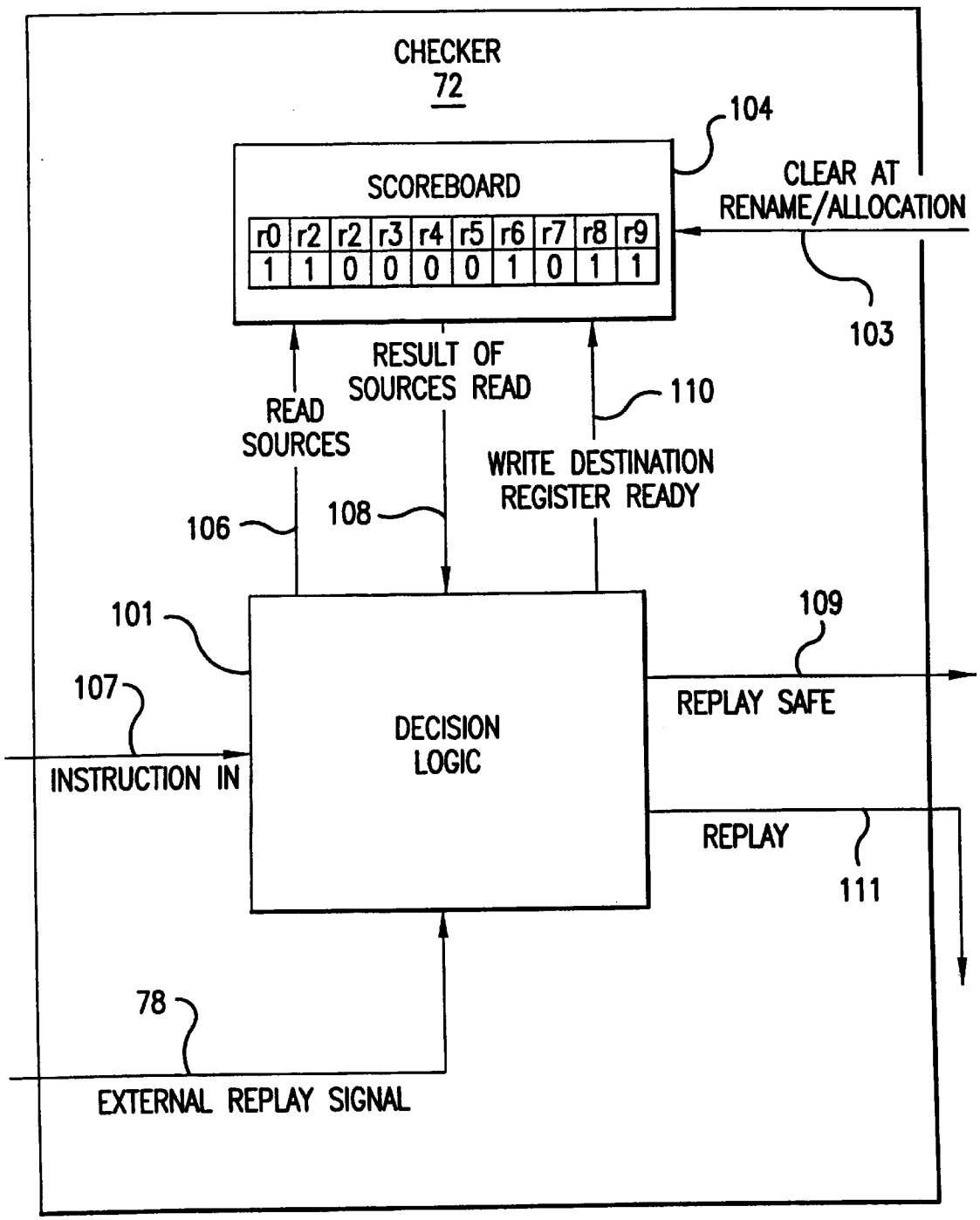
FIG. 2 is a detailed block diagram of a checker having a scoreboard in accordance with one embodiment of the present invention.

FIG. 2 is a detailed block diagram of checker 72 that shows how a scoreboard is used in accordance to one embodiment of the present invention. Checker 72 includes a scoreboard 104 and decision logic 101. Decision logic 101 receives the instructions on line 107 and external replay signal 78. Decision logic 101 further receives inputs from scoreboard 104 on line 108 which inform decision logic 101 if all input sources were correct at execution time. If external replay signal 78 is de-asserted and the source inputs were ready (or correct), decision logic 101 decides that the instruction executed correctly and outputs the instruction on line 109 to retirement unit 62. Otherwise the instruction is replayed by outputting the instruction on line 111 to replay multiplexer 56. When an instruction is determined to be correctly executed, scoreboard 104 is set at the appropriate time on register ready line 110 to indicate that the destination is ready/available/correct. The elapse of the appropriate time equals the latency of the instruction.

In one embodiment, scoreboard 104 is 10-bits wide and is used to keep track of which registers are ready. Each bit represents a register, and, for example, a "0" indicates that the register is not ready while a "1" indicates that the register is ready. Decision logic 101 can request a reading of each bit, and hence determine the readiness of the sources of each instruction through line 106. The result of the sources read (i.e., the status of each bit of scoreboard 104) is returned to decision logic 101 on line 108. Decision logic 101 can update the status of a register in scoreboard 104 on line 110.

Scoreboard 104 is updated via line 103 to indicate that a destination is not available/not ready when a register is brought in for reuse (i.e. when the instruction is allocated). A destination cannot be available unless the instruction executed correctly. This is how checker 72 clears the bits of scoreboard 104.

Figure 3:
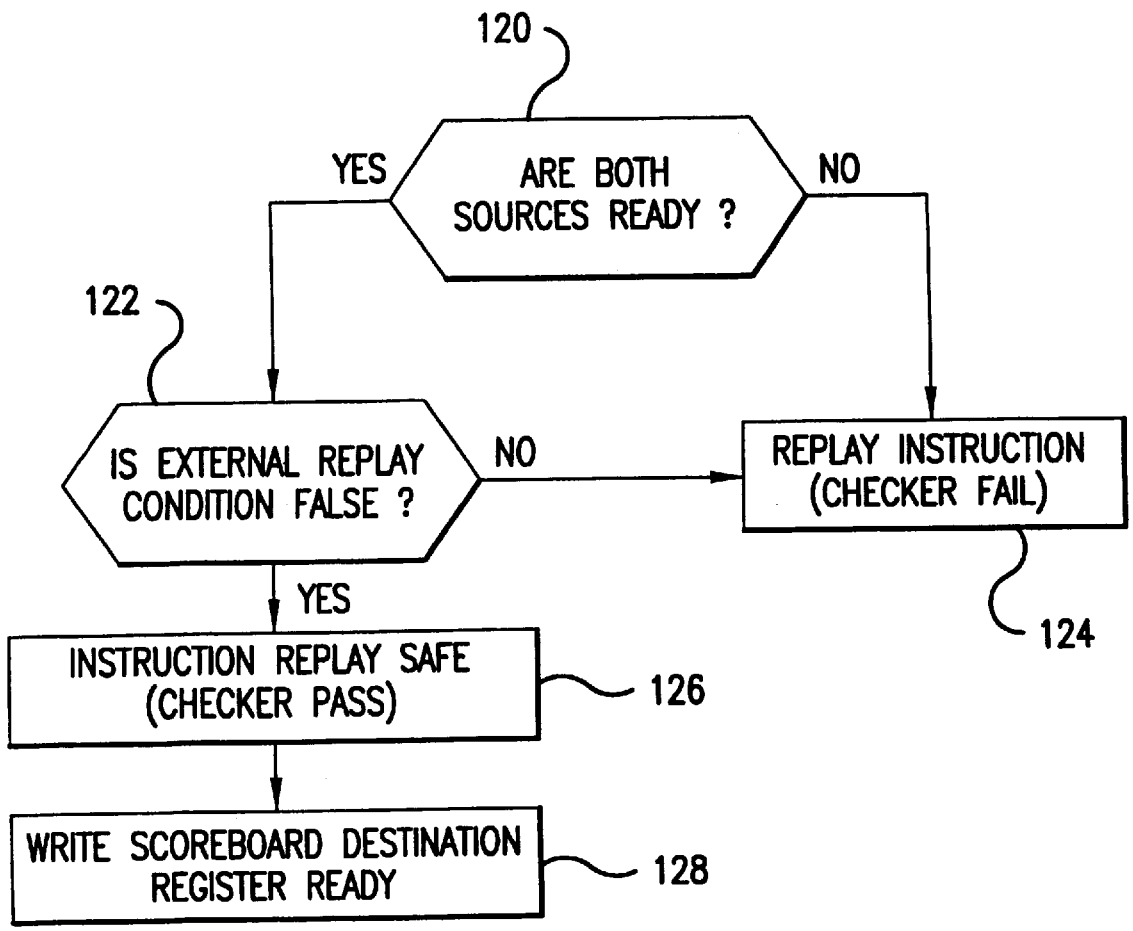
FIG. 3 is a flowchart of the steps performed by decision logic of the checker for each received instruction.

FIG. 3 is a flowchart of the steps performed by decision logic 101 of checker 72 for each received instruction. At step 120, decision logic 101 determines if both sources of the instruction are ready. As discussed, decision logic 101 determines this by receiving the status of each register from scoreboard 104 on line 108.

If both sources are not ready at step 120, the instruction is replayed at step 124 and is forwarded to replay multiplexer 56. If both sources are ready at step 120, at step 122 checker 72 determines if external replay signal 78 is false, therefore indicating that no replay is required because the instruction executed correctly.

If replay signal 78 is not false at step 122, the instruction is replayed at step 124 and is forwarded to replay multiplexer 56. If replay signal 78 is false at step 122, the instruction is replay safe at step 126 and is forwarded to retirement unit 62.

If the instruction is replay safe, at step 128 decision logic 101 writes in scoreboard 104 to indicate that the destination register of the instruction is "ready". In other words, decision logic 101 writes a "1" in the bit of scoreboard 104 that represents the destination register of the instruction.

A problem in executing the steps of FIG. 3 can arise as processor clock cycles become increasingly short as newer processors operate at faster and faster frequencies. This may result in the need to write and read from the same location in scoreboard 104 in very close timing proximity. For example, if each clock cycle of processor 50 is 1.0 ns long, consider a situation where it takes about 0.5 ns each to read and write from scoreboard 104. This is very difficult to accomplish, but suppose it can be done by building an extremely fast circuit.

However, a problem still remains. Consider two instructions, I1 and I2. Suppose I2 uses the results from I1. Suppose I1 and I2 are dispatched in back to back cycles. If decision logic 101 begins reading scoreboard 104 at time t=0.0 for I1, it will finish reading scoreboard 104 at time t=0.5. Next, decision logic 101 must take time to determine if I1 executed correctly. Suppose that takes about 0.25 ns. Add 0.5 ns for a write. By the time the write is completed, the time elapsed is t=0.5+0.25+0.5=1.25 ns.

However, I2 was dispatched a cycle behind I1. Hence it must start its read at t=1.0. Now there is a causality problem: The write from a previous operation has not completed before a read from the next one begins. Add electrical interference and the wire delays associated with transmitting signals across large distances, and it becomes nearly impossible to even reach the aggressive timing requirements of completing reads and writes in 0.5 ns. That makes it impossible to operate processor 50 at the increasingly desired high frequencies.

Therefore, there is a need for a mechanism that provides a faster access time for back-to-back writes and reads to the same location. Checker 72 provides a solution by breaking the problem into two parts. Specifically, checker 72 uses the conventional scoreboard solution described above for dependencies separated by greater than two cycles. However, it also uses a checker matrix engine for resolving dependencies between instructions in very close proximity. It does so by determining which instructions in close proximity are dependent on which instructions ahead of time. It sets up a matrix of dependency. As instructions flow through decision logic 101 they signal whether they were executed correctly or not. This information is used along with the dependency information to quickly determine if an instruction has executed correctly. Thus the checker matrix engine offers a high speed solution for a small time slice.

Figure 4:
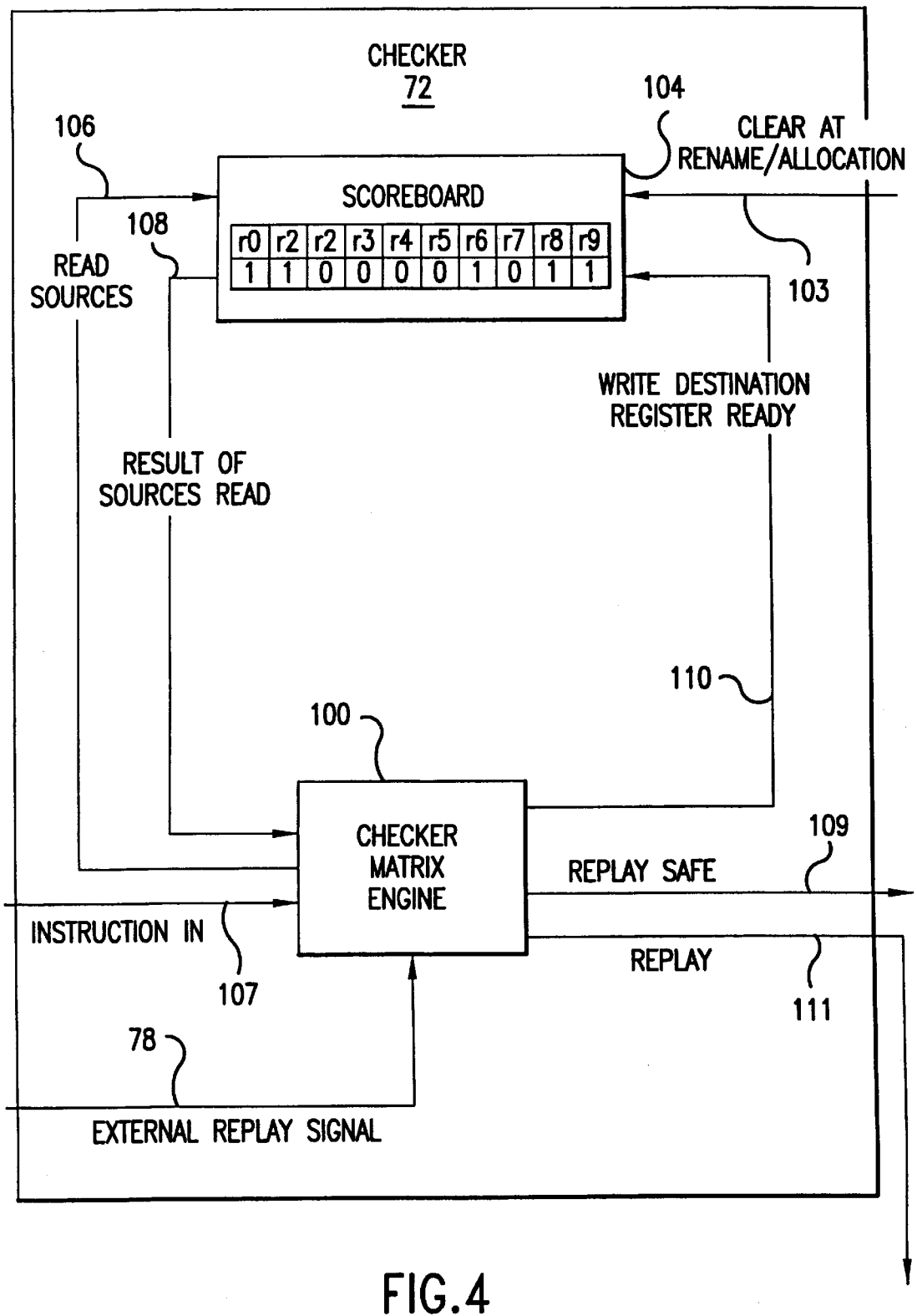
FIG. 4 is a detailed block diagram of a checker in accordance with one embodiment of the present invention.

FIG. 4 is a block diagram of checker 72 in accordance with one embodiment of the present invention that includes a checker matrix engine 100 and scoreboard 104. Checker matrix engine 100 implements the steps of FIG. 3 in a high-speed fashion.

The operation of checker matrix engine 100 can best be described with an example of a series of dispatched instructions. FIG. 5 illustrates a list of instructions that are dispatched in consecutive dispatch cycles by scheduler 30. Each instruction ("I1", "I2", etc.) includes two sources and one destination. Therefore, for example, on dispatch cycle 1, I1 is dispatched. I1's sources are register 10 ("r10") and r11. I1's destination is r12. On dispatch cycle 2, I2 is dispatched. I2's sources are r12 and r10, and destination is r13. I2 is dependent on I1 because one of its sources, r12, is produced by I1 (r12 is I1's destination register). On dispatch cycle 3, I3 is dispatched, and so on, through ten dispatch cycles. However, on dispatch cycles 7, 9 and 10 no instructions are dispatched.

FIGS. 6A–6J show the condition of checker matrix engine 100 during each dispatch cycle of FIG. 5. As shown in, for example, FIG. 6A, checker matrix engine 100 includes a holding buffer or destination register file 210, and a dependency matrix 200. Holding buffer 210 includes multiple entries, or rows, that correspond to an instruction. Dependency matrix 200 includes multiple rows corresponding to the entries in holding buffer 210, and multiple columns. Each column corresponds to a dependency on an entry in holding buffer 210.

In FIGS. 6A–6J holding buffer 210 and dependency matrix 200 include three entries. Holding buffer 210 further includes a valid column 204 and a destination column 206. A "1" in valid column 204 indicates that a valid instruction is in the corresponding entry. The destination of the instruction for an entry is written in destination column 206. A write flag ("wr") 202 points to the most recently stored instruction. Holding buffer 210 must contain two ports for sources to snoop a destination. If a source matches its destination then the appropriate dependency bit is set.

Figure 6A:
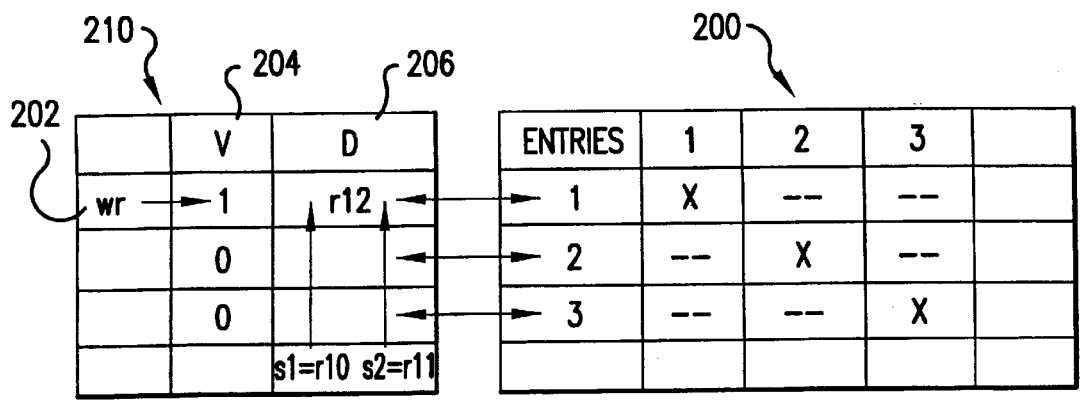

Therefore, in FIG. 6A at dispatch cycle 1, I1 is written into holding buffer 210 in the first entry. The destination of I1 is r12, and the sources of I1 are r10 and r11 (the sources for the instruction pointed to by write flag 202 are indicated on the bottom of holding buffer 210). The second and the third entries in FIG. 6A do not include a valid instruction and therefore a "0" for those entries is written in valid column 204. I1 is dependent on instructions whose destination matches I1's sources (i.e., r10 or r11)

Dependency matrix 200 includes bits, or elements, that correspond to the dependency of an instruction in one entry of holding buffer 210 to an instruction in another entry of holding buffer 210. A "D" as one of the elements indicates that the instruction is dependent on the instruction entry of holding buffer 210 that corresponds to the column number of dependency matrix 200. For example, referring to FIG. 6B, the "D" in the first column of the second entry indicates that the instruction in the second entry of holding buffer 210 is dependent on the result produced by the instruction in the first entry of holding buffer 210. In other words, I2 (the instruction in the second entry of holding buffer 210) is dependent on I1 (the instruction in the first entry of holding buffer 210). Because an instruction cannot depend on itself, each box along the diagonal of dependency matrix 200 is marked with an "x."

In FIG. 6A (dispatch cycle 1), I1 is written into holding buffer 210 at entry 1.

Figure 6B:
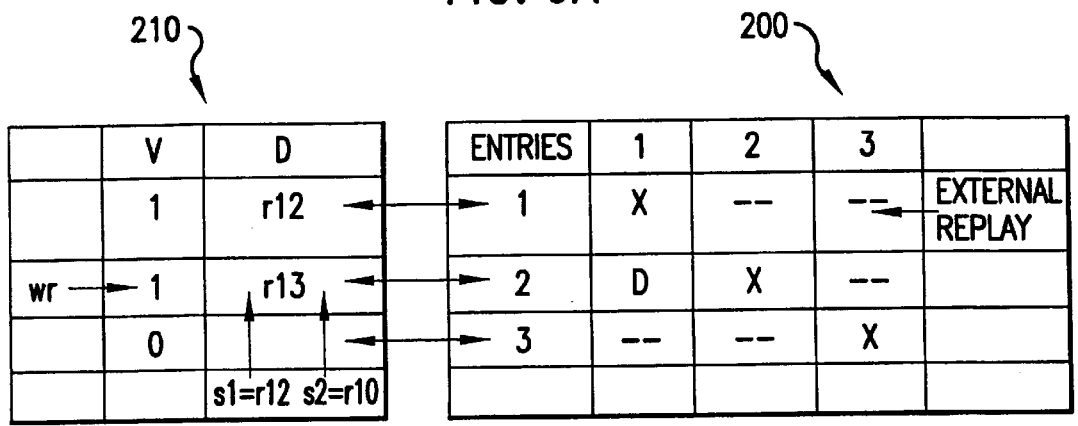

In FIG. 6B (dispatch cycle 2), I2 is written into holding buffer 210 at entry 2. I2's sources (r10 and r12) are matched against valid destinations in holding buffer 210. Dependencies are determined based on the matches and dependency matrix 200 is updated accordingly. In this example, a "D" is written in column 1, entry 2, of matrix 200 to indicate that I2 is dependent on I1. Further, during dispatch cycle 2 an external replay indication is received by checker 72 on external replay signal 78 for I1.

Figure 6C:
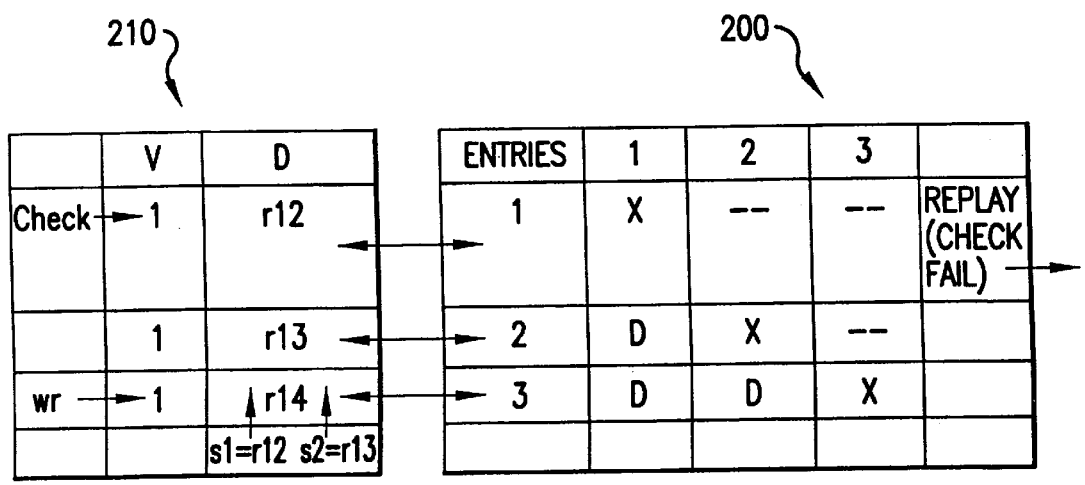

In FIG. 6C (dispatch cycle 3), I3 is written into holding buffer 210 at entry 3, and a "D" in column 1, entries 2 and 3 of matrix 200 indicates that I2 and I3 are dependent on I1. A "D" in column 2, entry 3 of matrix 200 indicates that I3 is dependent on I2. Further, at dispatch cycle 3, I1 is checked by checker 72, and fails the check (i.e., is replayed) because of the external replay signal at dispatch cycle 2. Because it failed, I1 is sent to replay multiplexer 56 on line 111 of checker 72.

Figure 6D:
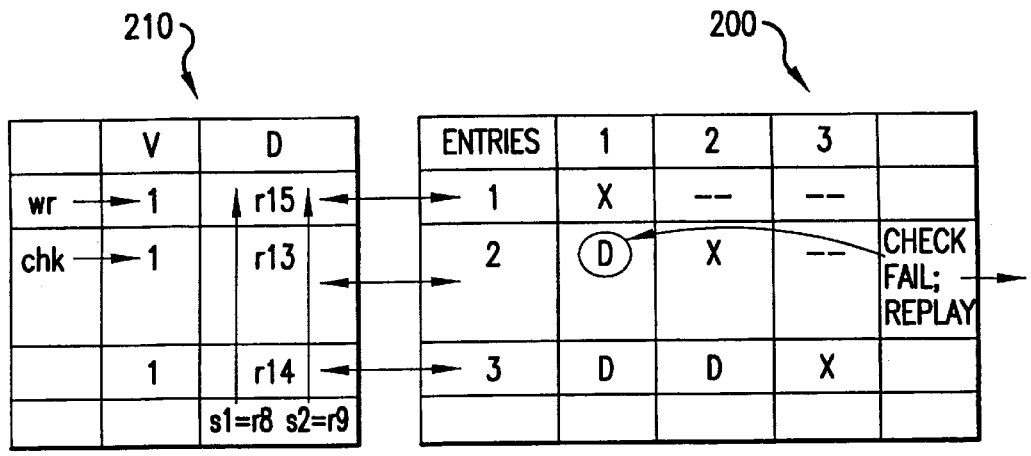

In FIG. 6D (dispatch cycle 4), I4 is written into holding buffer 210 at entry 1 and I2 in entry 2 is checked by checker 72. I2 fails the check and is replayed because there is at least one "D" in the row corresponding to entry 2 in matrix 200, indicating that I2 is depending on an instruction that did not execute correctly.

Figure 6E:
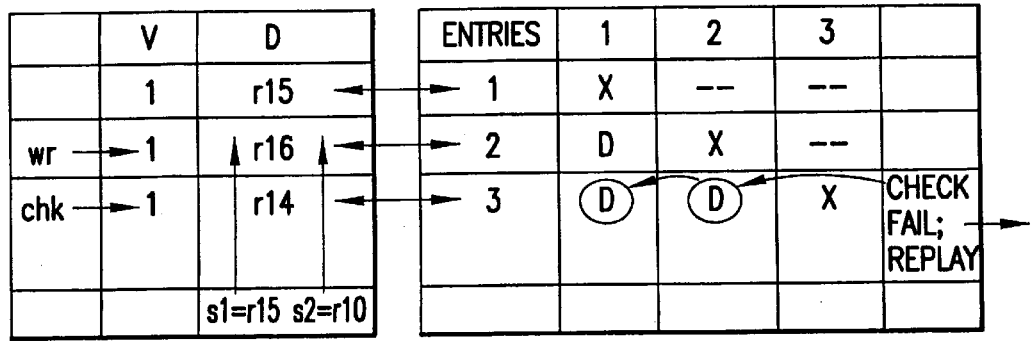

In FIG. 6E (dispatch cycle 5), I5 is written into holding buffer 210 at entry 2 and I3 in entry 3 is checked by checker 72. I3 fails the check and is replayed because there is at least one "D" in the row corresponding to entry 3 in matrix 200, indicating that I3 is depending on an instruction that did not execute correctly.

Figure 6F:
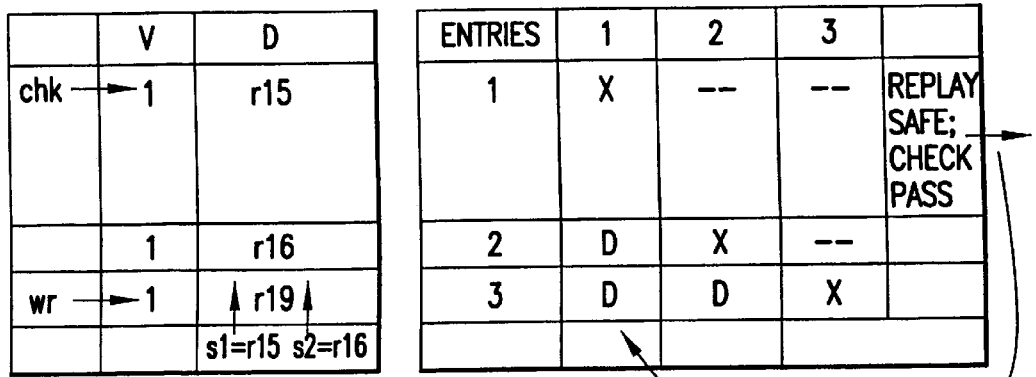

In FIG. 6F (dispatch cycle 6), I6 is written into holding buffer 210 at entry 3 and I4 in entry 1 is checked by checker 72. I4 passes the check and is replay safe because there are no "D"s in the row corresponding to entry 1 in matrix 200, indicating that I4 is not dependent on an instruction that did not execute correctly. Further, there is no external replay condition received for I4 on external replay signal 78. I4 is sent to retirement unit 62 on line 109, and because I4 executed correctly, the entire column in matrix 200 that corresponds to I4 (i.e., the first column) is cleared. Clearing the column means erasing all "D"s in that column.

In FIG. 6G (dispatch cycle 7), no instruction is dispatched so a "0" is written into holding buffer 210 at entry 1. Further, I5 in entry 2 is checked by checker 72. I5 passes the check and is replay safe because there are no "D"s in the row corresponding to entry 2 in matrix 200, indicating that I5 is not dependent on an instruction that did not execute correctly. Further, there is no external replay condition received for I5 on external replay signal 78. I5 is sent to retirement unit 62, and because I5 executed correctly, the entire column in matrix 200 that corresponds to I5 (i.e., the second column) is cleared.

In FIG. 6H (dispatch cycle 8), I7 is written into holding buffer 210 at entry 2 and I6 in entry 3 is checked by checker 72. I6 passes the check and is replay safe because there are no "D"s in the row corresponding to entry 3 in matrix 200, indicating that I6 is not dependent on an instruction that did not execute correctly. Further, there is no external replay condition received for I6 on external replay signal 78. I6 is sent to retirement unit 62 on line 109, and because I6 executed correctly, the entire column in matrix 200 that corresponds to I6 (i.e., the third column) is cleared.

In FIG. 6I (dispatch cycle 9), no instruction is dispatched so a "0" is written into holding buffer 210 at entry 3. Further, no instruction is checked by checker 72.

Figure 6J:
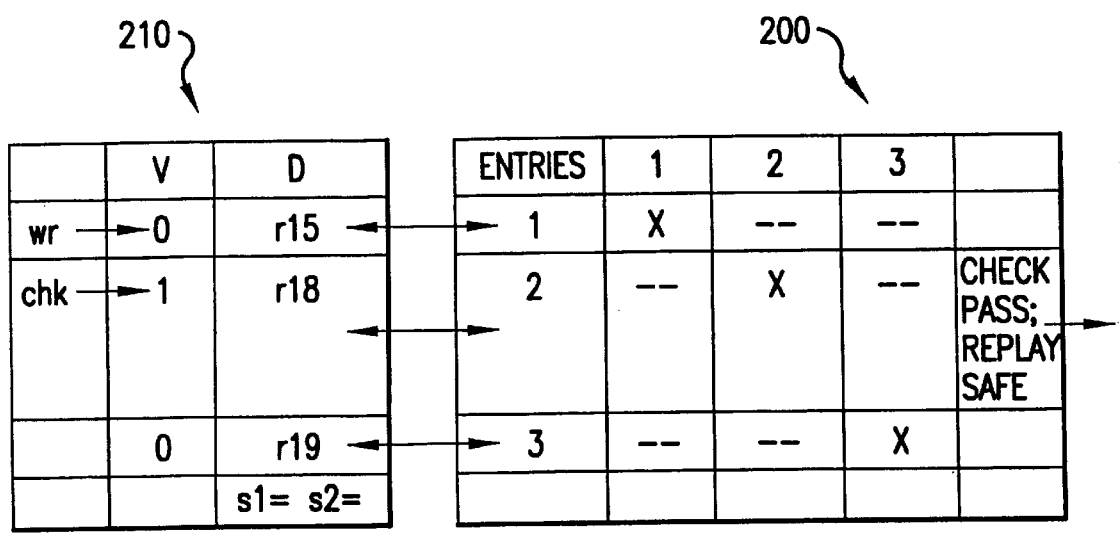

Finally, in FIG. 6J (dispatch cycle 10) no instruction is dispatched so a "0" is written into holding buffer 210 at entry 1. I7 is checked by checker 72 and because there are no "D"s in entry 2 of matrix 200, I7 is replay safe and is sent to retirement unit 62.

As disclosed, checker 72 receives instructions and determines if the instructions have executed correctly. Checker 72 makes the determination based on a scoreboard and an external replay signal. In order to quickly make the determination, checker 72 may include a checker matrix engine.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, although the checker described is part of a replay system, the checker can be used in other processor applications such as parity checking, any memory operations, checking address dependencies, or any other application that needs to determine dependencies.

What is claimed is:

1. A computer processor comprising:
   a checker for receiving an instruction, said checker comprising:
   a scoreboard;
   an input for receiving an external replay signal; and
   decision logic coupled to said scoreboard and said input;
   wherein said decision logic determines whether the instruction executed correctly based on both said scoreboard and said external replay signal.

2. The processor of claim 1, wherein the instruction comprises at least one source register and a destination register, and said scoreboard includes a status of the source register and the destination register, said decision logic reading the status of the source register from said scoreboard to determine whether the instruction executed correctly.

3. The processor of claim 1, wherein said decision logic replays the instruction if the instruction is determined to have not executed correctly.

4. The processor of claim 1, wherein said decision logic dispatches the instruction to retirement if the instruction is determined to have executed correctly.

5. The processor of claim 2, wherein said decision logic updates the status of the destination register if the instruction is determined to have executed correctly.

6. The processor of claim 1, said decision logic comprising:
   a checker matrix engine.

7. The processor of claim 6, said checker matrix engine comprising:
   a holding buffer having a plurality of entries for holding corresponding instructions; and
   a dependency matrix having a plurality of rows, each row corresponding to an entry in said holding buffer, and having a plurality of columns, each column corresponding to a dependency on an entry in said holding buffer.

8. The processor of claim 7, wherein said decision logic determines whether the instruction executed correctly based on a dependency indication in the dependency matrix row corresponding to the instruction.

9. The processor of claim 8, wherein one of said columns is cleared if the instruction is determined to have executed correctly.

10. The processor of claim 8, wherein said dependency indication comprises at least one bit set in the dependency matrix row corresponding to the instruction.

11. A method of checking a computer instruction having at least one source, said method comprising:
   (a) determining if the source is ready by reading a status of a scoreboard;
   (b) determining if an external replay condition is false;
   (c) replaying the instruction if the source is not ready or the external replay condition is not false; and
   (d) dispatching the instruction to retirement if the source is ready and the external replay condition is false.

12. The method of claim 11, wherein step (b) comprises receiving an external replay signal.

13. The method of claim 11, wherein step (a) comprises the step of:
   checking a dependency matrix for a dependency indication in a row corresponding to the instruction if the instruction is in close proximity with a second instruction.

14. The method of claim 13, further comprising the step of clearing a row of the dependency matrix if the source is ready and the external replay condition is false.

15. A system for checking a computer instruction having at least one source, said system comprising:
- means for determining if the source is ready;
- means for determining if an external replay condition is false;
- means for replaying the instruction if the source is not ready or the external replay condition is not false; and
- means for dispatching the instruction to retirement if the source is ready and the external replay condition is false.

16. A computer system comprising:
- a bus;
- a memory device coupled to said bus; and
- a processor that executes a computer instruction, said processor comprising:
- a scoreboard;
- input for receiving an external replay signal; and
- decision logic coupled to said scoreboard and said input;
- wherein said decision logic determines whether the instruction executed correctly based on both said scoreboard and said external replay signal.

17. The computer system of claim 16, wherein the instruction comprises at least one source register and a destination register, and said scoreboard includes a status of the source register and the destination register, said decision logic reading the status of the source register from said scoreboard to determine whether the instruction executed correctly.

18. The computer system of claim 16, wherein said decision logic replays the instruction if the instruction is determined to have not executed correctly.

19. The computer system of claim 16, wherein said decision logic dispatches the instruction to retirement if the instruction is determined to have executed correctly.

20. The computer system of claim 17, wherein said decision logic updates the status of the destination register if the instruction is determined to have executed correctly.

21. The computer system of claim 16, said decision logic comprising:
- a checker matrix engine.

22. The computer system of claim 21, said checker matrix engine comprising:
- a holding buffer having a plurality of entries for holding corresponding instructions; and
- a dependency matrix having a plurality of rows, each row corresponding to an entry in said holding buffer, and having a plurality of columns, each column corresponding to a dependency on an entry in said holding buffer.

23. The computer system of claim 22, wherein said decision logic determines whether the instruction executed correctly based on a dependency indication in the dependency matrix row corresponding to the instruction.

24. The computer system of claim 23, wherein one of said columns is cleared if the instruction is determined to have executed correctly.

25. The computer system of claim 23, wherein said dependency indication comprises at least one bit set in the dependency matrix row corresponding to the instruction.

* * * * *